United States Patent
Droske

(10) Patent No.: US 11,390,710 B2
(45) Date of Patent: *Jul. 19, 2022

(54) REVERSIBLE CROSSLINKED POLYMERS

(71) Applicant: WiSys Technology Foundation, Inc., Madison, WI (US)

(72) Inventor: John P. Droske, Stevens Point, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,073

(22) Filed: Apr. 29, 2013

(65) Prior Publication Data

US 2013/0289233 A1 Oct. 31, 2013

Related U.S. Application Data

(60) Provisional application No. 61/639,203, filed on Apr. 27, 2012.

(51) Int. Cl.
*C08G 63/688* (2006.01)

(52) U.S. Cl.
CPC ................................. *C08G 63/6886* (2013.01)

(58) Field of Classification Search
CPC ............ C08G 63/6886; C08G 63/6884; C08G 75/045; C08G 18/631; C08G 18/671; C08G 18/792; C08G 4/00; C08G 63/823; C08G 63/87; C08G 69/04; C08G 69/28; C08G 73/1007; C08G 75/26; C08G 18/3876; C08G 18/2009; C08G 18/089; C08G 18/18; C08G 18/4676; C08G 63/918

USPC .................................................. 528/293, 294
See application file for complete search history.

(56) References Cited

U.S. PATENT DOCUMENTS

| | | | | |
|---|---|---|---|---|
| 2,924,585 A | * | 2/1960 | Schmitz | C08G 63/6884 525/167 |
| 3,817,930 A | * | 6/1974 | Villa | C08L 67/02 528/294 |
| 9,187,596 B2 | * | 11/2015 | Droske | C07C 323/52 |
| 2011/0269903 A1 | * | 11/2011 | Droske et al. | 524/603 |

OTHER PUBLICATIONS

Makoto Kato et al. "Direct Enzymatic Synthesis of a Polyester with Free Pendant Mercapto Groups" Biomacromolecules 2009, 10, 366-373 ( published in Web Dec. 12, 2008).*
Th. Rieckmann et al "Poly(Ethylene Terephthalate) Polymerization—Mechanism, Catalysis, Kinetics, Mass Transfer and Reactor Design", Modern Polyesters: Chemistry and Technology of Polyesters and Copolyesters (Year: 2003).*
Poly(ethylene succinate)—Tech Data (Year: 2016).*
Poly(ethylene sebacate)—Tech Data (Year: 2015).*

* cited by examiner

*Primary Examiner* — Frances Tischler
*Assistant Examiner* — Gennadiy Mesh
(74) *Attorney, Agent, or Firm* — Boyle Fredrickson S.C.

(57) ABSTRACT

A reversibly crosslinked polymer and methods for producing and using the obtained polymer are disclosed. In particular, reversibly crosslinked polymers of the invention comprise polyesters formed by the reaction of mercaptosuccinic acid and a diol to form a monomeric unit that includes thiol groups as crosslinking moieties. Oxidation of the thiol groups affords crosslinked polymer comprising a disulfide linkage that, upon reduction of the disulfide linkage, provides a non-crosslinked polymer. In some embodiments, polymers of the invention are degradable and are biocompatible.

10 Claims, 1 Drawing Sheet

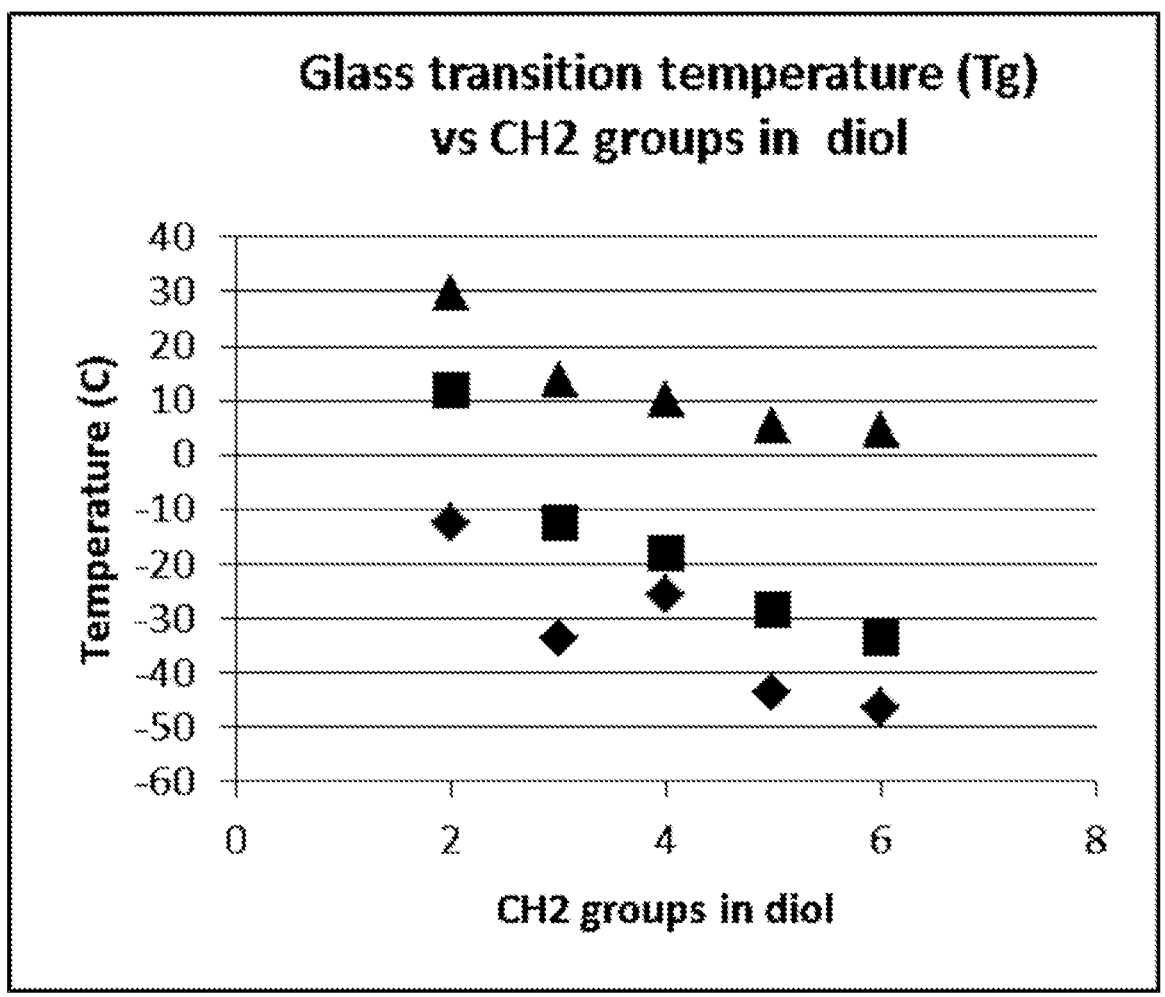

REVERSIBLE CROSSLINKED POLYMERS

CROSS-REFERENCE TO RELATED APPLICATIONS

This application claims the priority benefit of U.S. Provisional Application No. 61/639,203, filed Apr. 27, 2012, which is incorporated herein by reference in its entirety.

FIELD OF THE INVENTION

The present invention relates to degradable reversibly cross-linked polymers and methods for producing and using the same.

BACKGROUND OF THE INVENTION

The design and use of "environmentally friendly" materials is necessary to ensure our standard of living and the longevity of our planet. Thermoset materials, such as cured rubber and phenolics, are among the most difficult materials to recycle and reuse. The terms "thermoset plastics," "thermosets," "thermoset resins," "thermoset polymers" and "thermoset materials" are used interchangeably herein and refers to "cured" polymers in which at least a portion of polymeric molecules are chemically inter-connected (i.e., cross-linked) to other polymeric molecules forming a network structure (e.g., somewhat like a basketball net). Thermoset materials are generally stronger than thermoplastic materials due to this three dimensional network of bonds (i.e., cross-linking), and are also better suited to high-temperature applications up to the decomposition temperature. However, they are generally more brittle. Since they are "set" (non-reformable), they tend not to be recyclable.

The terms "thermosetting polymer," "thermosetting material" and "thermosetting resin" are used interchangeable herein and refer to a prepolymer that changes to a thermoset polymer upon curing. Often thermosetting resins are soft solids, liquids, viscous materials or otherwise are in a malleable state. Curing of thermosetting materials can be achieved by the action of heat, chemical reaction and/or suitable radiation, or both. A cured thermosetting polymer is called a thermoset. Thermosetting polymers are designed to be molded into their final form. As stated above, curing thermosetting polymers can be done through heat (generally above 200° C.), through a chemical reaction, or using irradiation such as electron beam processing. Once hardened (i.e., set or cured), thermoset resins or polymers cannot be reheated and melted back to a liquid form. As a result, thermosets have excellent properties for their intended purposes. For example, they resist heat, are typically insoluble, have a relatively high tensile strength, and do not change shape easily. However, they are not recyclable.

The curing process transforms the thermosetting resin into a plastic or rubber by a cross-linking process. Energy and/or catalysts are added that cause the molecular chains to react at chemically active sites (e.g., unsaturated or epoxy sites in conventional thermosetting resins), linking into a rigid, 3-D structure. The cross-linking process forms a molecule with a larger molecular weight (i.e., polymer), resulting in a material with a higher melting point. Reheating of the thermoset polymers results in decomposition of the thermoset polymers not melting. Therefore, a thermoset material cannot be melted and re-shaped after it is cured. Accordingly, conventional thermosets cannot be recycled or reused, except perhaps as filler material.

While some of the properties of thermoset polymers, such as their ability to withstand high temperature, insoluble in solvents, infusible to many materials, make them useful in a wide variety of applications, their reuse is challenging because thermoset plastics usually do not biodegrade and are not easily recycled.

Accordingly, there is a need for biodegradable and/or reversibly cross-linked polymers and methods for producing the same.

SUMMARY OF THE INVENTION

Some aspects of the invention provide degradable reversibly cross-linked polymers and methods for using the same. As used herein, the terms "reversibly cross-linked polymer" and "reversible cross-linked polymer" are used interchangeably herein and refer to a polymer that has been cured, i.e., cross-linked, in which the cross-linking can be reversed by a chemical reaction as disclosed herein or by acid hydrolysis or under composting conditions. Suitable acid hydrolysis conditions for reversing cross-linking are also disclosed herein. It should be appreciated that at least 50% of the cross-linking in polymers of the invention can be reversed using chemical reaction conditions (e.g., using dithiothreitol) or acid hydrolysis conditions (e.g., dilute aqueous acid conditions, such as hydrochloric, sulfuric or phosphoric) disclosed herein within six months, typically within three months, often within two months, and more often within one month. The term "degradable" refers to the ability of polymers of the invention to degrade (e.g., breakdown to smaller molecules) under composting conditions (e.g., landfill conditions). Typically at least 50% of the polymers of the invention are degraded within five years, often within three years, more often within one year, and most often within six months.

BRIEF DESCRIPTION OF THE DRAWINGS

FIG. 1 is a graph showing glass transition temperatures (Tg, ° C.) of poly(alkylenemercapto-succinates) as a function of diol chain length at different curing stages. ◇=uncrosslinked resin; ■=films from air oxidation; ▲=film after additional treatment with DMSO (dimethylsulfoxide).

DETAILED DESCRIPTION OF THE INVENTION

Some aspects of the invention provide a degradable reversibly cross-linked polymer that is produced by (i) polymerization of a monomeric unit mixture comprising mercaptosuccinic acid and a diol of the formula HO—R$^1$—OH, and (ii) cross-linking the thiol group of the mercaptosuccinic acid, where R$^1$ is an alkylene, heteroalkylene, arylene, or heteroarylene. The term "mercaptosuccinic acid" refers to succinic acid or its mono- or di-ester or a derivative thereof having at least one thiol or a protected thiol group attached to its 2- or 3-position, e.g., a compound of the formula:

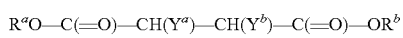

where each of R$^a$ and R$^b$ is independently hydrogen or each of —OR$^a$ and —OR$^b$ is independently an ester group, and each of Y$^a$ and Y$^b$ is independently hydrogen, alkyl, thiol (—SH) or a protected thiol (—SR$^x$, where R$^x$ is a thiol protecting group), provided at least one of Y$^a$ and Y$^b$ is thiol or a protected thiol.

As used herein, the term "alkyl" refers to a saturated linear monovalent hydrocarbon moiety of one to twenty, typically one to twelve, carbon atoms or a saturated branched monovalent hydrocarbon moiety of three to twenty, typically three to twelve, carbon atoms. Exemplary alkyl group include, but are not limited to, methyl, ethyl, n-propyl, 2-propyl, tert-butyl, pentyl, and the like. The term "aryl" refers to a monovalent mono-, bi- or tricyclic aromatic hydrocarbon moiety of 6 to 15 ring atoms which is optionally substituted with one or more, typically one, two, or three substituents within the ring structure. When two or more substituents are present in an aryl group, each substituent is independently selected. The term "heteroalkyl" means a branched or unbranched, acyclic saturated alkyl moiety containing carbon, hydrogen and one or more heteroatoms, such as O, N, or S, in place of a carbon atom. Representative examples include, but are not limited to, ethers, thioethers, amino substituted alkyls, etc. The term "heteroaryl" means a monovalent monocyclic or bicyclic aromatic moiety of 5 to 12 ring atoms containing one, two, or three ring heteroatoms selected from N, O, or S, the remaining ring atoms being C. The heteroaryl ring is optionally substituted independently with one or more substituents, typically one or two substituents. Exemplary heteroaryl includes, but is not limited to, pyridyl, furanyl, thiophenyl, thiazolyl, isothiazolyl, triazolyl, imidazolyl, isoxazolyl, pyrrolyl, pyrazolyl, pyrimidinyl, benzofuranyl, isobenzofuranyl, benzothiazolyl, benzoisothiazolyl, benzotriazolyl, indolyl, isoindolyl, benzoxazolyl, quinolyl, isoquinolyl, benzimidazolyl, benzisoxazolyl, benzothiophenyl, dibenzofuran, and benzodiazepin-2-one-5-yl, and the like. The terms "alkylene", "arylene", "heteroalkylene", and "heteroarylene" refer to a divalent alkyl, aryl, heteroalkyl, and heteroaryl, respectively, as defined herein. The term "protecting group" refers to a moiety that when attached to a reactive group in a molecule masks, reduces or prevents that reactivity. Examples of protecting groups can be found in T. W. Greene and P. G. M. Wuts, *Protective Groups in Organic Synthesis*, 3$^{rd}$ edition, John Wiley & Sons, New York, 1999, and Harrison and Harrison et al., *Compendium of Synthetic Organic Methods*, Vols. 1-8 (John Wiley and Sons, 1971-1996), which are incorporated herein by reference in their entirety. Representative hydroxy protecting groups include acyl groups, benzyl and trityl ethers, tetrahydropyranyl ethers, trialkylsilyl ethers and allyl ethers. Representative amino protecting groups include formyl, acetyl, trifluoroacetyl, benzyl, benzyloxycarbonyl (CBZ), tert-butoxycarbonyl (Boc), trimethyl silyl (TMS), 2-trimethylsilyl-ethane-sulfonyl (SES), trityl and substituted trityl groups, allyloxycarbonyl, 9-fluorenylmethyloxycarbonyl (FMOC), nitro-veratryloxycarbonyl (NVOC), and the like. The term "corresponding protecting group" means an appropriate protecting group corresponding to the heteroatom to which it is attached. The term "leaving group" has the meaning conventionally associated with it in synthetic organic chemistry, i.e., an atom or a group capable of being displaced by a nucleophile and includes halo (such as chloro, bromo, and iodo), alkanesulfonyloxy, arenesulfonyloxy, alkylcarbonyloxy (e.g., acetoxy), arylcarbonyloxy, mesyloxy, tosyloxy, trifluoromethanesulfonyloxy, aryloxy (e.g., 2,4-dinitrophenoxy), methoxy, N,O-dimethylhydroxylamino, and the like.

As used herein, the term "treating", "contacting" or "reacting" refers to adding or mixing two or more reagents under appropriate conditions to produce the indicated and/or the desired product. It should be appreciated that the reaction which produces the indicated and/or the desired product may not necessarily result directly from the combination of two reagents which were initially added, i.e., there may be one or more intermediates which are produced in the mixture which ultimately leads to the formation of the indicated and/or the desired product.

In some embodiments, the monomeric unit mixture comprises at least 5 mole %, typically at least 10% mole %, often at least 25 mole % and more often at least 50 mole % of mercaptosuccinic acid. Still in other embodiments, at least 5 mole %, typically at least 10 mole %, often at least 25 mole %, more often at least 50 mole %, and most often at least 80 mole % of the thiol group of said mercaptosuccinic acid is cross-linked.

Yet in other embodiments, the monomeric unit mixture is polymerized in the absence of a solvent, e.g., in the presence of less than 10 mole %, typically less than 5 mole %, often less than 1 mole %, and most often less than 0.5 mole % of a solvent.

Still in other embodiments, the monomeric unit mixture is polymerized in the absence of a catalyst. In such instances, simply mixing the monomeric unit mixture under an appropriate temperature results in the formation of the desired polymer. Such polymerization does not require any additional purification step to remove a catalyst as no catalyst is used.

In some embodiments, the monomeric unit mixture further comprises lactic acid, glycolic acid, propylene fumarate, caprolactone fumarate, lactide ethylene oxide fumarate, succinic acid, or a mixture thereof. In this manner, a wide variety of copolymers having reversible cross-linkage are encompassed within the scope of the invention. In some particular instances, one or more of these carboxylic acid monomer comprises at least 10 mole %, typically at least 20 mole %, and often at least 30 mole % of the total monomeric unit mixture. It should be appreciated that polymers and copolymers of these carboxylic acids (e.g., poly (lactic acid), i.e., PLA) are known to be biodegradable. Accordingly, in some embodiments, copolymers of the invention are also biodegradable. Furthermore, in other embodiments, polymers of the invention are hydrolytically degradable, e.g., under aqueous conditions, typically in the presence of an acid.

Another aspects of the invention provide a degradable reversibly cross-linked polymer comprising a repeating unit of the formula:

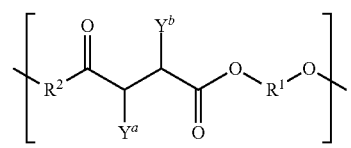

wherein
each of $R^1$ is independently an alkylene, heteroalkylene, arylene, or heteroarylene;
$R^2$ is absent or a copolymeric unit derived from a monomer selected from the group consisting of lactic acid, glycolic acid, propylene fumarate, caprolactone fumarate, lactide ethylene oxide fumarate, succinic acid, and a mixture thereof;
$Y^a$ is a cross-linked thiol group; and
$Y^b$ is H, $C_1$-$C_6$ alkyl, or a cross-linked thiol group.

It should be appreciated that a sufficient number of these repeating units are present in order to form the desired polymer. And the number of repeating units present depends on the amount of the starting material (i.e., monomers) used in the polymerization process.

When $R^2$ is absent, the polymer comprises monomeric units consisting of mercaptosuccinic acid (a compound of Formula I) and the diol HO—$R^1$—OH. When a copolymeric unit is present, the structure of $R^2$ depends on the particular monomer used. For example, when the monomer is lactic acid, then:

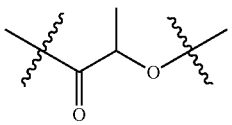 [SMILES: *OC(C)C(*)=O]

whereas when the monomer is glycolic acid, then:

$R^2 =$ 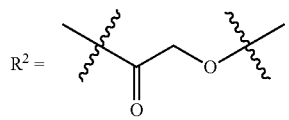 [SMILES: *OCC(*)=O]

and so forth.

In some embodiments, each of $R^1$ is independently $C_2$-$C_{20}$ alkylene.

Yet in other embodiments, $Y^b$ is H. Still in other embodiments, $Y^b$ is a cross-linked thiol group.

Some degradable reversibly cross-linked polymers of the invention are highly transparent or translucent. In some instances, such polymers have transparency similar to that of glass, i.e., having visible light transparency of at least 50%, typically at least 75%, often at least 80%, more often at least 90% and most often at least 95% that of glass.

In some aspects of the invention, polymers of the invention are thermoset plastics or elastomers. However, unlike conventional thermoset plastics, polymers of the invention have reversible cross-linking. For example, cross-linked dithiol can be reverted back to free thiol groups by chemical reaction (e.g., via reduction) as disclosed in the Examples section. Furthermore, dithiol cross-linkage of the polymers of the invention can also be reversed to generate free thiol groups hydrolytically, e.g., by acid hydrolysis.

Often polymers of the invention are also biodegradable.

Still in other embodiments, polymers of the invention are biocompatible. As such, polymers of the invention can be used in a variety of medical applications such as sutures, stents, bone adhesives, and in drug delivery systems.

Yet in other embodiments, polymers of the invention are bioresorbable polymers.

In other embodiments, the degradable reversibly cross-linked polymers of the invention are copolymers of lactic acid, glycolic acid, propylene fumarate, caprolactone fumarate, lactide ethylene oxide fumarate, succinic acid, or a mixture thereof.

Still further, combinations of the various embodiments described herein form other embodiments. For example, in one particularly embodiment polymers of the invention are biodegradable, biocompatible, and bioresorbable. In this manner, a wide variety of polymers are embodied within the present invention.

In some instances, polymers of the invention are produced using a solventless polymerization process. As used herein, the term "solventless" refers to a chemical process that require less than 10 mole %, typically less than 5 mole %, often less than 1 mole %, and most often in the absence (i.e., <0.5 mole %) of a solvent. In other instances, polymers of the invention are produced in the absence of a catalyst. As used herein, the term "in the absence of a catalyst" refers to a reaction condition where no catalyst is actively or intentionally added to the reaction mixture.

The monomers or monomeric unit mixtures for the polymerization can be attained from sustainable feedstocks and contain a reversible crosslinking group. In some embodiments, curing of these materials yielded cross-linked products that were optically transparent and exhibited mechanical properties ranging from highly flexible (e.g., able to bend without breaking when a moderate force is applied, for example, using one's arm strength) to hard, strong and tough materials, depending on the degree of crosslinking. The materials were characterized, before and after cross-linking, by Differential Scanning Calorimetry (DSC), Gel Permeation Chromatography (GPC), FTIR, and NMR. The glass transition temperatures (Tg) were dependent on the copolymer ratio and increased with thermal curing. The Tg advanced further with the addition of a chemical cross-linking agent. Cross-linking in the cured polymer can be chemically reversed. For example, when subjected to acid hydrolysis, polymers fully dissolved in aqueous solution. Alternatively, degradation can occur under composting conditions or via reduction, e.g., using dithiothreitol. Cross-linked polymers can be reversed to the original, uncross-linked polymer chains as described herein. All of these methods allow for recovery and reuse of the materials.

In conventional thermoset plastics, cross-linking typically results in increased thermal transition temperatures and improved mechanical properties due to the formation of stable carbon-carbon bonds, but these bonds also complicate and can interfere with biodegradation. To affect cross-linking while maintaining the possibility of biodegradation, the present invention uses disulfide linkages. In some embodiments, copolymers of lactic acid containing pendant thiol groups were prepared from polyesterification of mercaptosuccinic acid (MSA, i.e., compound of Formula I where $Y^a$ is —SH and $Y^b$ is hydrogen), 1,5-pentanediol, and other carboxylic acids, such as lactic acid, succinic acid, fumaric acid, and derivatives thereof. The pendant thiol in MSA is non-nucleophilic under these conditions and protection-deprotection of the thiol group was not necessary.

In some instances, monomeric starting materials were combined at 155° C. to form clear viscous liquids. The liquids were characterized by HNMR, FT-IR, and GPC. Thermoset films were formed by curing in an oven, e.g., at 110° C. Films with a variety of properties ranging from hard and brittle to elastomeric, have been prepared by varying the monomer composition. For biomedical applications, especially bone adhesion, the materials must be compatible with hydroxyapatite, a major component of bone. It also is necessary to include a porogen that after implantation will form channels for new bone growth. Films containing porogen and hydroxyapatite were prepared and cured and the porogen was readily removed upon exposure to water.

Poly(lactic acid), poly(lactic acid/glycolic acid), and poly (propylene fumarate) are among the promising bioresorbable materials for biomedical applications.[1] These materials have been used in a variety of applications, such as bioresorbable stents and bone cements, and have been employed in bone replacement surgery. While in vitro studies of the above materials are promising, in vivo use of the materials prepared to date sometimes has been complicated by unexpectedly short or long degradation times.

Poly(caprolactone fumarate)$_2$ and poly(lactide ethylene oxide fumarate)$_3$ have been reported as biocompatible and bioresorbable tissue scaffolds. These copolymers contain a fumarate moiety that can subsequently be cross-linked to provide additional strength to a bone adhesive scaffolding. These copolymers showed enhanced properties for orthopedic applications over the parent homopolymers and have been reported to show promise for injectable (minimally invasive) and paste orthopedic applications.

Previously, the present inventor has synthesized and characterized a series of copolymers of poly(propylene fumarate-co-L-lactic acid). These copolymers were prepared by zinc chloride-catalyzed transesterification and afforded copolymers with a range of properties depending on the fumarate:lactic acid ratio. Subsequent curing afforded C—C cross-linked, insoluble materials. In an effort to prepare aliphatic polyesters with a reversible crosslinking site, the present invention introduces a thiol group into the main chain. Efforts to prepare polyesters with pendant thiol groups in the main chain have been reported previously, but these have either utilized enzymes such as *candida antartica*, or involved thiol protection-deprotection, or experimental details were lacking Disclosed herein is the synthesis of poly(alkylene mercaptosuccinates) under solventless, zinc chloride catalyzed esterification conditions. Subsequent cross-linking thermally in air or at room temperature with oxidizing agents afforded high quality, transparent to translucent films. The thiol group in mercaptosuccinic acid did not exhibit significant nucleophilicity under typical esterification conditions and protection-deprotection of the thiol was not required.

Polymers and methods of the invention differ considerably from traditional olefinic (C═C) or epoxy-type crosslinking. In typical thermoset materials, such as phenolics, maleimides, or epoxy resins, crosslinking occurs through C—C bonds and generally is considered to be permanent. As observed in proteins, thiols were employed here to afford disulfide crosslinks. The more labile disulfide linkages allow for reversible crosslinking, after treatment with dithiothreitol or other reagents known to break disulfide bonds. In addition, the monomers used are available from non-petroleum, renewable resources. For example, 1,3-propanediol and 1,4-butanediol can be prepared from glucose or xylose and 1,3-propanediol can also be isolated from recombinant *E. coli*. Succinic acid can be synthesized from glucose or xylose or isolated from the fermentation of feedstocks with *E. coli*. Further, these crosslinked polymers breakdown or degrade to biocompatible degradation products. This makes them especially well-suited for biomedical applications, as well as applications where sustainable or "green" materials are desired.

One of the advantages of methods of the invention is that it is not necessary to employ a protection-deprotection scheme during polymerization and degradation processes. Moreover, the esterification reaction or polymerization is catalyzed, without significant thioester formation, even when common Lewis acids such as zinc chloride or mineral acids, like sulfuric acid are used.

The resins cure, without significant heat evolution, in air or with added oxidizing agents such as $H_2O_2$, to form, in some instances, transparent to translucent, flexible to rigid films depending on the monomers used. Crosslinking of pendant thiols significantly increases the properties of cured resins and increases in glass transition temperatures resulting from crosslinking have been on the order of 30-40° C. or more over the parent uncrosslinked resins. As shown in FIG. 1, the glass transition temperature depends on both the diol chain length used as well as different curing stages. The optical transparency of these films is excellent and the index of refraction is very close to that of ordinary glass (about 1.49).

Polyesters containing pendant thiol groups can be prepared using zinc chloride, sulfuric acid, and other common catalysts without significant thioester formation and thus, without the need for protection-deprotection of the thiol groups. The resultant materials are especially well-suited for applications requiring good strength, high transparency and biocompatibility. By utilizing other monomeric units to form different copolymers, methods of the invention provides various thermoset materials. Polymers of the invention have distinct advantages in being fully sustainable with an environmentally acceptable life cycle, i.e., renewable feedstocks and fully reversible chemistry.

Additional objects, advantages, and novel features of this invention will become apparent to those skilled in the art upon examination of the following examples and supplemental materials thereof, which are not intended to be limiting. In the Examples, procedures that are constructively reduced to practice are described in the present tense, and procedures that have been carried out in the laboratory are set forth in the past tense.

EXAMPLES

All chemicals were obtained from Sigma-Aldrich and were used as received. Differential Scanning calorimetry was performed using a Perkin-Elmer Pyris 1 Thermal Analyzer equipped with DSC and TGA modules. A Perkin-Elmer DMA 7e also was employed. Molecular weights were determined with an Agilent 1200 Gel Permeation Chromatograph with Waters columns and Wyatt Minidawn light scattering, Viscostar, and RI detectors. NMR spectra were obtained with a Bruker 400 MHz spectrometer.

Example 1

Synthesis of poly(lactic acid-co-pentylenemercaptosuccinate)

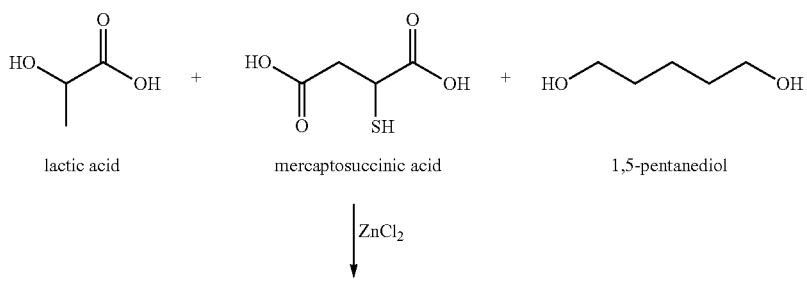

-continued

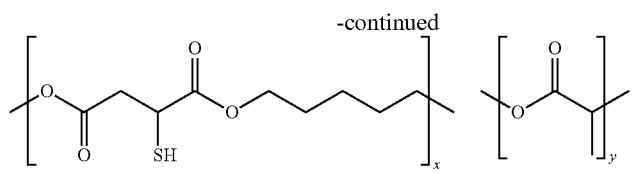

To a 100 mL round bottom flask equipped with a condenser and with magnetic stirring, was added 7.56 grams (0.0503 moles) of mercaptosuccinic acid, 5.2 mL (0.050 moles) of 1,5-pentanediol, 4.4 mL (0.050 moles) L-lactic acid, and 0.136 grams (0.00100 moles) of zinc chloride. The flask was flushed with nitrogen and then maintained under a static nitrogen atmosphere. The reaction mixture was heated at 150° C./hour to 155° C. and then maintained at 155° C. for 4 hours. After this period, heating was continued under reduced pressure (0.05 mm Hg) for an additional 4 hours. After cooling to room temperature, a minimum of methylene chloride was added to dissolve the product. The solution was then poured into 400 mL of cold, vigorously stirred, 1:1 diethyl ether:hexane. Decanting of the liquid and drying under reduced pressure (<1 mm Hg) afforded 9.5 g (63%) of a translucent viscous residue of I. The structure of I was confirmed by IR, $^1$HNMR, and $^{13}$CNMR spectroscopy. The copolymer also was further characterized by gel permeation chromatography and differential scanning calorimetry.

Example 2

Synthesis of poly(lactic acid-co-propylenemercaptosuccinate)

The procedure of Example 1 was followed except 3.6 mL (0.050 moles) of 1,3-propanediol was used.

Example 3

Synthesis of poly(lactic acid-co-butylenemercaptosuccinate)

The procedure of Example 1 was followed except 4.4 mL (0.050 moles) of 1,4-butanediol was used.

Example 4

Other Catalysts

Other catalysts that can be used for the synthesis of the copolymers include, but are not limited to, other acids, such as sulfuric, hydrochloric, and stannous octanoate.

Example 5

Chain Extension/Polymerization

A comparison of polymer of Example 1 prepared with and without a 4 hour heating at 155° C. under reduced pressure (0.05 mm Hg) was done using gel permeation chromatography (GPC). GPC traces of copolymer prepared using the 4 hour heating under reduced pressure showed higher molecular weight and fewer oligomers than GPC traces of the same polymer prepared without the extra 4 hour heating under vacuum.

Example 6

Curing and Reversible Crosslinking

Neat viscous samples containing free pendant thiol groups of polymer of Example 1 were poured onto 8 in ×8 in glass plates and cured at 110° C. in air for several days to effect crosslinking. The resultant translucent films were insoluble in all solvents attempted. The glass transition temperature of the polymer was −43.5° C. before curing and advanced to −10.5° C. as a result of crosslinking in air during curing to form disulfide linkages. Films of copolymer also showed significantly improved thermal stability over commercially available poly(lactic acid), showing significantly less discoloration and degradation when subjected to high temperatures for similar times on a laboratory hot plate.

Example 7

Other Conditions

As shown in FIG. 1, DMSO increased the glass transition temperatures beyond those obtained by curing in air. The cured copolymer films were soluble in aqueous acid and underwent degradation under standard compost conditions.

Example 8

Monomeric starting materials were combined at 155° C. to form clear viscous liquids. The liquids were characterized by HNMR, FT-IR, and GPC. Thermoset films were formed by curing in an oven at 110° C. Films with a variety of properties ranging from hard and brittle to elastomeric, have been prepared by varying the monomer composition. For biomedical applications, especially bone adhesion, the materials must be compatible with hydroxyapatite, a major component of bone. It also is necessary to include a porogen that after implantation will form channels for new bone growth. Films containing porogen and hydroxyapatite were prepared and cured and the porogen was readily removed upon exposure to water.

Bioresorbable materials, such as resorbable sutures, are well-known in medicine. The resorbable crosslinked materials described here offer a number of advantages over existing materials, such as improved strength and longer degradation times. This makes them particularly well-suited for use as bone adhesives, arterial stents, and in drug delivery systems. Polymers of the invention can also be used as biodegradable plastic packaging.

Example 9

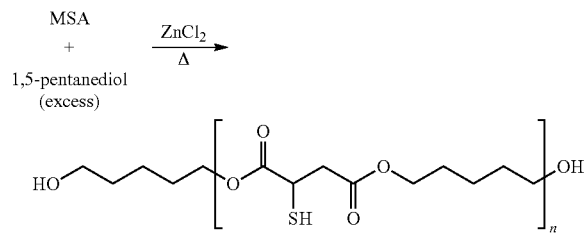

Synthesis of oligo-bis(5-hydroxypentyl)-2-mercaptosuccinate: To a round bottom flask equipped with a condenser and with magnetic stirring, was added 7.54 grams (0.0502 moles) of mercaptosuccinic acid, 15.7 mL (0.150 moles) of 1,5-pentanediol, and 0.1742 grams (0.00128 moles) of zinc chloride. The flask was flushed with nitrogen and then maintained under a static nitrogen atmosphere. The reaction mixture was heated at 150° C./hour to 155° C. and then maintained at 155° C. for 4 hours. After cooling to room temperature, 100 mL of methylene chloride was added to dissolve the product. The solution was washed 2× with 100 mL of distilled water and 2× with 100 mL of 50% saturated NaCl. The organic layer was dried over sodium sulfate and the solvent was removed via rotary evaporation. Residual solvent was removed under reduced pressure (less than 1 mm Hg) at slightly above ambient temperature and the structure was confirmed by IR, $^1$HNMR, and $^{13}$CNMR spectroscopy. The use of other diols, such as ethyleneglycol, 1,3-propyleneglycol, 1,4-butanediol, and 1,6-hexanediol, and changing the ratio of diol to mercaptosuccinnic acid, afforded a series of bis(hydroxyalkylene)-2-mercaptosuccinate oligomers with varying molecular weights. Yields of oligomers ranged from ~40% to 90+%, with higher molecular weight oligomers giving the best yields.

Chain Extension/Polymerization. A round bottom flask containing the oligo-bis(hydroxyl-alkylene succinate) and equipped with a condenser and magnetic stirring, was flushed with nitrogen and then heated at 150° C./hour to 155° C. under reduced pressure (less than 1 mm Hg) and then maintained at 155° C. for 4 to 8 hours. After cooling to room temperature, methylene chloride was added and the polymer was precipitated into cold methanol or cold ether: hexane. After drying under reduced pressure, the polymer was dissolved in CDCl$_3$ and the structure was confirmed by $^1$HNMR and $^{13}$CNMR spectroscopy.

Curing and Reversible Crosslinking. Neat viscous samples containing free pendant thiol groups were poured onto 8 in ×8 in glass plates and cured at 110° C. in air for one or more days to effect crosslinking. The resultant films swelled but were insoluble in all solvents attempted. After the initial curing, DMSO was added to the films for five minutes and then the films were cured further at 110° C. Efforts to solubilize the swelled polymers were successful with dithiothreitol in methylene chloride or aqueous acids (hydrochloric, sulfuric, and phosphoric).

Example 10

The design and use of "environmentally friendly" materials is necessary to ensure at least the current standard of living and the longevity of our planet. Thermoset synthetic materials, such as cured rubber and phenolics, are among the most difficult materials to recycle and reuse. As disclosed herein, thermoset materials have been synthesized via solventless step-growth polymerization. The monomers for the polymerization can be attained from sustainable feedstocks and contain a reversible crosslinking group. Curing of these materials yielded crosslinked products that were optically transparent and exhibited mechanical properties ranging from highly flexible to hard, strong and tough materials, depending on the degree of crosslinking. The materials were characterized, before and after crosslinking, by Differential Scanning calorimetry (DSC), Gel Permeation Chromatography (GPC), FTIR, and NMR. The glass transition temperatures (Tg) were dependent on the copolymer ratio and increased with thermal curing. The Tg advanced further with the addition of a chemical crosslinking agent. Crosslinking in the cured polymer can be chemically reversed. When subjected to acid hydrolysis, the materials fully dissolved in aqueous solution. Alternatively, degradation can occur under composting condition.

Recovery and Reuse: The polymer chains and matrix can be degraded in several ways. Crosslinked polymers can be reversed to the original, uncrosslinked polymer chains employing a chemical agent, such as dithiothreitol. Alternatively, the polymers have been shown to break down under standard compost conditions. In addition, both crosslinked and uncured polymers undergo hydrolysis under acidic conditions. All of these methods allow for recovery and reuse of the materials.

Monomers: The monomers used are available from renewable sources. Two diols, 1,3-propanediol and 1,4-butanediol, can be synthesized from glucose or xylose. The 1,3-propanediol can also be isolated from recombinant E. coli. Succinic acid can be synthesized from glucose or xylose2 or isolated from the fermentation of feedstocks with E. coli. Most succinic acid is produced at corn wet milling biorefineries. The crosslinking agent can be synthesized from aspartic acid.

Reaction: The polymers were synthesized via a "green" method that included solventless conditions, moderate temperatures, environmentally benign byproducts, and catalyst recovery. At the reaction temperature, the monomers were fully dissolved precluding need for an additional solvent. The reaction occurred at a moderate temperature of 155° C., that is well below the temperatures used for many commercial polyester syntheses. In addition, the only significant volatile by-products is water. The catalyst can be recovered and reused, if desired.

Processing: The polymers formed viscous liquids that were processed with heat and/or chemical agents forming films, fibers, and other thermoset materials. The properties varied depending on the structure of the monomers and the extent of crosslinking. The synthesized polymers exhibited properties ranging from very flexible, rubbery, optically clear materials to hard, tough, and opaque materials.

Conclusion: Thermosetting polyesters have been synthesized, using "green" solventless methods, from monomers that can be obtained from renewable feedstocks. By varying the crosslink density, thin films and plastic samples with a wide variety of properties have been obtained. The crosslinking has been shown to be reversible, allowing for reuse of the polymers. The materials can be hydrolyzed with aqueous acid (presumably yielding the starting monomers) or degraded in compost, for a fully sustainable life cycle for these materials.

Example 11

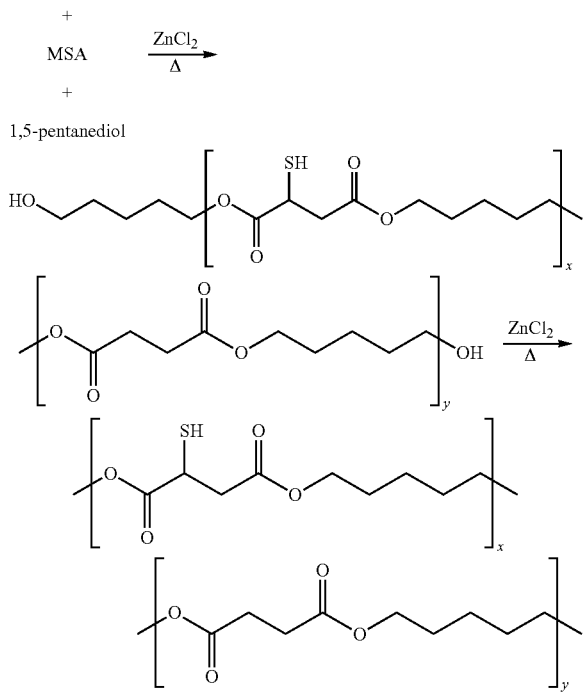

Synthetic bioresorbable materials are used widely as sutures and drug delivery systems. The materials typically used are synthetic polyesters, such as polycaprolactone, polyglycolic acid, and poly(lactic acid), that degrade slowly via hydrolysis reactions. There is increasing interest in the use of resorbable materials for advanced biomedical applications, such as stents, tissue scaffolds, and orthopedic adhesives. One method to improve the properties of these materials is the use of crosslinking reactions to form links between polymer chains. Usually crosslinking decreases biodegradability because the crosslinking reaction is irreversible and stable C—C bonds are formed. Polymers of the present invention use a disulfide linkage that acts as a reversible crosslinker to maintain biodegradability after crosslinking. This affords the possibility of both advanced resorbable materials for biomedical applications and gives the possibility of unique "green" thermoset materials for non-medical applications. These green thermosets can be made from renewable monomers (aliphatic diols and succinic acid can be synthesized from glucose or xylose4) that degrade to environmentally acceptable products after use.

Reaction: To a round bottom flask equipped for simple distillation was added mercaptosuccinic acid (MSA), succinic acid (SA), and 1,5-pentanediol in a 3:1 diol:diacid ratio with zinc chloride as catalyst. The flask was purged with nitrogen and maintained under a nitrogen atmosphere while it was heated to 155° C. and magnetically stirred for 4 hours. Oligomeric products were isolated by washing with 5% NaCl solution followed by saturated NaCl to remove excess diol and catalyst. To increase the molecular weight, oligomers were then allowed to react under reduced pressure (0.100 torr) at 155° C. for 4 additional hours. The product was precipitated into either cold methanol or 1:1 diethyl ether:hexanes and the transparent viscous material was collected and dried under reduced pressure. The materials were characterized by $^1$H-NMR, 2D $^1$H-1H COSY NMR, and Gel Permeation Chromatography (GPC) with light scattering (Wyatt Technologies), viscometry, and refractometry detectors.

The short chain polymers, or oligomers, were synthesized by esterification of an aliphatic diol with the diacid crosslinker, mercaptosuccinic acid. The crosslink density was controlled by including succinic acid and modifying the mercaptosuccinic acid:succinic acid ratio. The molecular weight of the oligomers was controlled by overbalancing the reaction with diol which resulted in alcohol end-caps. The oligomers were chain extended to higher molecular weights by transesterification. The polymers were cured in air at 110° C. to effect crosslinking and gave high quality films.

Results and Discussion: Use of 2D COSY NMR permitted complex coupling to be resolved and all peaks in the $^1$H-NMR were assigned. A comparison of expected and actual integration values for MSA and SA showed excellent agreement and confirmed that the monomers were incorporated into the oligomers in the desired ratios. Stack plots and integration values of $^1$H-NMR spectra of the diols also clearly showed the expected MSA:SA ratios. Gel Permeation Chromatography, before and after chain extension, confirmed that the molecular weight increased significantly.

Conclusion: A series of oligomers and polymers with varying crosslink densities was synthesized. The oligomers and polymers were characterized by 1H-NMR, 2D COSY 1H-1H NMR, and Gel Permeation Chromatography. 1H-NMR showed excellent agreement between starting monomer concentrations and monomer ratios in the polymer. GPC showed successful chain extension of the oligomers which were crosslinked to give flexible, high quality thermoset films.

Example 12

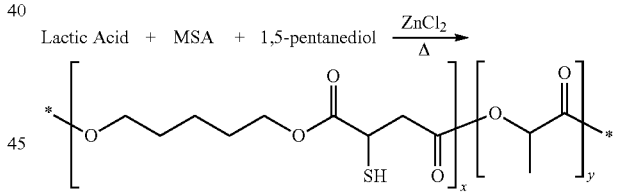

Poly(lactic acid) (PLA), a biodegradable plastic, is finding increasing use in applications from disposable cups and clear plastic food containers to arterial stents and bone scaffolds. PLA has a relatively low glass transition temperature (about 65° C.). Higher use temperatures are observed in semi-crystalline PLA and certain PLA blends, but the generally low thermal transition temperatures limit the use of PLA in many applications. In an effort to raise the glass transition temperatures of poly(lactic acid) polymers, thermoset polymers comprising copolymers of PLA were prepared using crosslinking reactions in air.

Reaction: To a 100 mL round bottom flask equipped with a condenser and with magnetic stirring, was added 7.56 grams (0.0503 moles) of mercaptosuccinic acid, 5.2 mL (0.050 moles) of 1,5-pentanediol, 3.2 mL (0.040 moles) L-lactic acid, and 0.136 grams (0.00100 moles) of zinc chloride. The flask was flushed with nitrogen and then maintained under a static nitrogen atmosphere. The reaction mixture was heated at 150° C./hour to 155° C. and then maintained at 155° C. for 4 hours. After this period, heating was continued under reduced pressure (0.05 mm Hg) for an additional 4 hours. After cooling to room temperature, a minimum of methylene chloride was added to dissolve the product. The solution was then poured into 400 mL of cold, vigorously stirred, 1:1 diethyl ether:hexane. Decanting of the liquid and drying under reduced pressure (<1 mm Hg) afforded 9.5 g (67%) of a translucent viscous residue of the copolymer. The structure of copolymer was confirmed by IR, $^1$HNMR, and $^{13}$CNMR spectroscopy. The copolymer also was further characterized by gel permeation chromatography (GPC), differential scanning calorimetry (DSC), and preliminary thermooxidative stability evaluation.

Results and Discussion: Polyesterification of LA, MSA, and 1,5-pentanediol afforded a viscous liquid that was characterized by NMR. The $^1$HNMR spectrum showed incorporation of the three monomers into the polymer chain in the same ratios as the original reactants. Gel permeation chromatography gave a single peak, consistent with formation of the copolymer. The trace was not bimodal, as would be expected if a blend of homopolymers of poly(lactic acid) and poly(alkylenemercaptosuccinate) had formed instead of the copolymer. GPC also showed that the molecular weight could be increased by heating copolymer for four hours under reduced pressure in the presence of zinc chloride. DSC of the copolymer before curing showed a Tg at −43.5° C. that advanced to −10.5° C. after curing in air at 110° C. for several days. The presence of a single glass transition temperature in the DSC traces again indicated formation of copolymer rather than two homopolymers.

Conclusion: Copolymer was characterized before and after crosslinking by differential scanning calorimetry (DSC), gel permeation chromatography (GPC), FTIR, $^1$HNMR, and $^{13}$CNMR. Curing of copolymer for several days in air at 110° C. afforded flexible, translucent films with a Tg that was 33° C. higher than the copolymer before curing/crosslinking Heating at elevated temperatures in air showed much higher thermooxidative stability for cured copolymer over PLA and greatly enhanced dimensional stability under conditions where PLA rapidly degraded.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A composition of matter comprising:
   a degradable reversibly cross-linked polymer produced in a reaction catalyzed by a zinc salt, wherein said reversibly cross-linked polymer comprises a repeating unit of the formula:

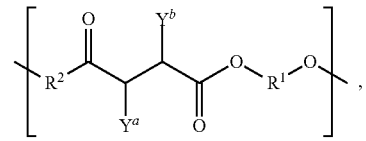

wherein
   each of $R^1$ is independently an alkylene, heteroalkylene, arylene, or heteroarylene;
   $R^2$ is derived from succinic acid;
   $Y^a$ is a cross-linked thiol group;
   $Y^b$ is a cross-linked thiol group
      an amount of a mercaptosuccinic acid;
      an amount of a diol of the formula HO—$R^1$—OH, where $R^1$ is an alkylene, heteroalkylene, arylene or heteroarylene, and
      an amount of a zinc salt, wherein the zinc salt is not bonded to the polymer.

2. The composition of matter of claim 1, wherein said repeating unit comprises at least 5% by mole of mercaptosuccinic acid.

3. The composition of matter of claim 1, wherein at least 5% of the thiol group of said mercaptosuccinic acid is cross-linked.

4. The composition of matter of claim 1, wherein said polymer is a thermoset plastic or an elastomer.

5. The composition of matter of claim 1, wherein said polymer is biodegradable.

6. The composition of matter of claim 1, wherein said polymer is hydrolytically degradable.

7. The composition of matter of claim 1, wherein said polymer is biocompatible.

8. The composition of matter of claim 1, wherein said polymer is a bioresorbable polymer.

9. The composition of matter of claim 1, wherein each of $R^1$ is independently $C_2$-$C_{20}$ alkylene.

10. The composition of matter of claim 1, wherein said diol is pentanediol.

* * * * *